V. FORSMAN AND E. DANIELSON.
BUSHING HOLDER.
APPLICATION FILED APR. 28, 1919.
1,339,448.
Patented May 11, 1920.
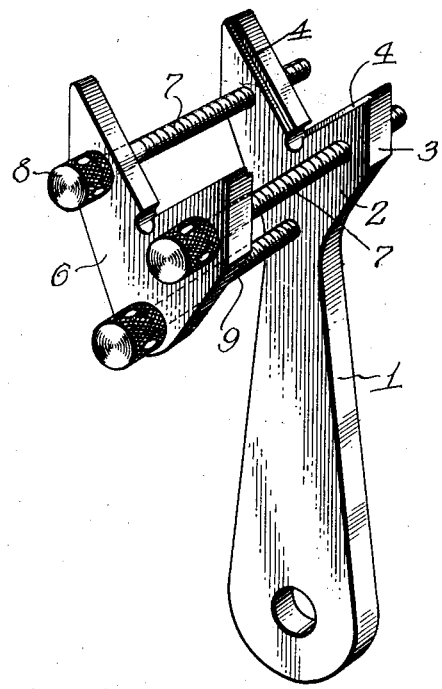
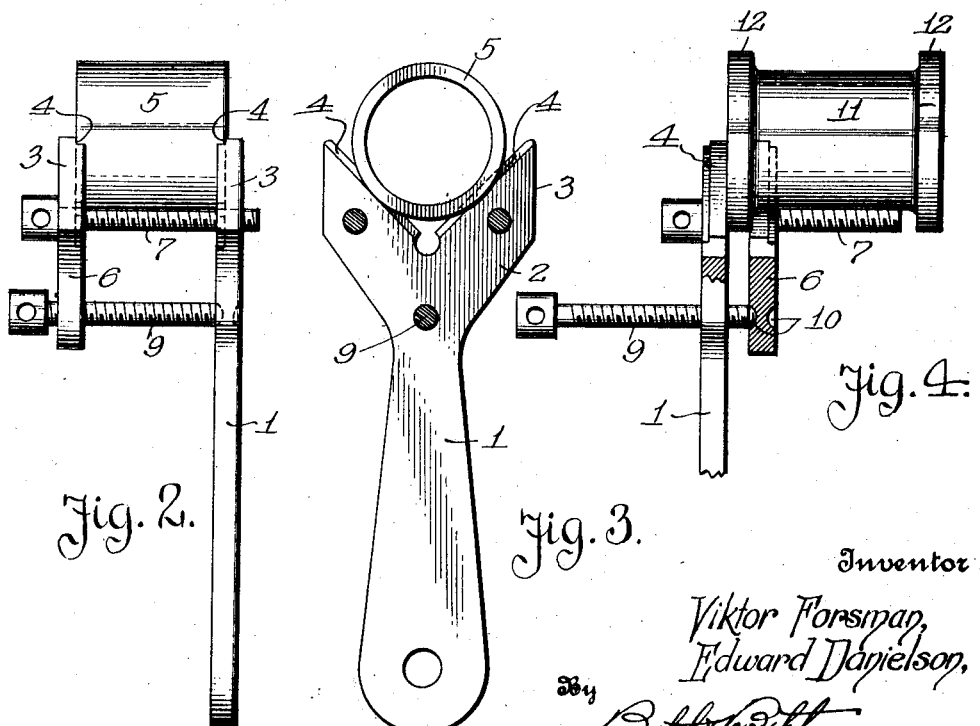
Inventor
Viktor Forsman,
Edward Danielson,
By
Attorneys

UNITED STATES PATENT OFFICE.

VIKTOR FORSMAN AND EDWARD DANIELSON, OF DETROIT, MICHIGAN.

BUSHING-HOLDER.

1,339,448.     Specification of Letters Patent.     Patented May 11, 1920.

Application filed April 28, 1919. Serial No. 293,175.

*To all whom it may concern:*

Be it known that we, VIKTOR FORSMAN and EDWARD DANIELSON, subjects of the King of Sweden, residing at Detroit, in the county of Wayne and State of Michigan, have invented certain new and useful Improvements in Bushing-Holders, of which the following is a specification, reference being had therein to the accompanying drawings.

Our invention aims to provide a novel tool or clamping device by which the ends of a bushing, tube or hollow structure may be safely held, without any danger of the walls of the structure being bent, collapsed or distorted by the clamping means, especially since the pressure brought to bear on the bushing or structure is lengthwise thereof in contradistinction to those clamping devices having jaws or other members which grip opposed side walls of a bushing.

Our invention further aims to provide a simple, durable and inexpensive bushing clamping device by which various types of bushings may be held so that the inner walls thereof may be lapped, polished or otherwise operated upon so as to place the bushing in perfect condition for supporting a rotary shaft or member, or snugly fitting on the shaft or member.

Our invention will be hereinafter specifically described and then claimed, and reference will now be had to the drawing, wherein—

Figure 1 is a perspective view of a clamping device in accordance with our invention;

Fig. 2 is a side elevation of the same;

Fig. 3 is a cross sectional view of the device, and

Fig. 4 is a side elevation of the device, partly broken away and partly in section, showing the parts thereof reversed for holding a special type of bushing.

A bushing holder or device in accordance with out invention comprises a handle 1 having a head 2 formed by diverging or angularly disposed jaws 3, said jaws having the edges thereof grooved or recessed, as at 4, so as to provide a substantially V-shaped seat for the end of a bushing 5. The opposite end of the bushing 5 is adapted to be held by a head or jaws 6, similar to the jaws 3 but devoid of the handle 1, and the head 6 is adjustably supported relative to the head 2 by a plurality of screws 7 and a single screw 9, said screws having knurled or turret heads 8. The screws 7 are in the outer ends of the jaws, and the screw 9 at the lower ends of the heads 2 and 3. The jaw screws 7 extend through all of the jaws, and the screw 9 simply through the head 6 and against the head 2, as best shown in Fig. 2, said head having sockets 10 to receive the end of the screw. This arrangement of the screws permits of the head 6 being maintained in parallelism with the head 2, and it is possible to set the jaw screws 7 so that the bushing 5 may be placed on the jaw seats and then the screw 9 adjusted to clamp the heads 6 and 2 in engagement with the end walls of the bushing. This obviates the necessity of adjusting the jaw screws 7 each and every time bushings of the same length are placed in the device, as it is only necessary to change the jaw screws when bushings of different lengths are to be held.

With the end walls of the bushing 5 clamped on the V-shaped seats of the heads 2 and 6, easy access can be had to the inner walls of the bushing, as clearly shown in Fig. 3, and there is no danger of the bushing walls being distorted, it being practically impossible to crush the bushing when the pressure thereon is lengthwise of the same.

As shown in Fig. 4, the heads 2 and 6 may be reversed, so that the outer faces of the heads confront each other, and this arrangement of the heads necessitates rearranging the screws 7 and 9. Now it is possible to grip the flange 12 of a bushing 11 between said heads and thus firmly hold one end of the bushing.

What we claim is:—

A bushing holder comprising heads each having diverging jaws shaped to receive the end edges of a bushing, said heads being reversible, connecting means for said heads, said connecting means including two screws extending through the jaws of both heads and a single screw extending through one head and engaging the other head, and a handle carried by one of said heads.

In testimony whereof we affix our signatures in presence of two witnesses.

VIKTOR FORSMAN.
             EDWARD DANIELSON.

Witnesses:
   KARL H. BUTLER,
   G. E. McGRANN.